US012603551B2

(12) United States Patent
Joshi et al.

(10) Patent No.: US 12,603,551 B2
(45) Date of Patent: Apr. 14, 2026

(54) HYBRID LIQUID AND AIR COOLING OF HIGH-POWER PERMANENT MAGNET MACHINE ROTOR

(71) Applicant: Hamilton Sundstrand Corporation, Charlotte, NC (US)

(72) Inventors: Ashutosh Joshi, Roscoe, IL (US); Debabrata Pal, Hoffman Estates, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 231 days.

(21) Appl. No.: 18/330,816

(22) Filed: Jun. 7, 2023

(65) Prior Publication Data

US 2024/0413711 A1     Dec. 12, 2024

(51) Int. Cl.
| | |
|---|---|
| H02K 9/197 | (2006.01) |
| H02K 9/02 | (2006.01) |
| H02K 9/04 | (2006.01) |
| H02K 9/10 | (2006.01) |
| H02K 7/18 | (2006.01) |

(52) U.S. Cl.
CPC .............. H02K 9/197 (2013.01); H02K 9/02 (2013.01); H02K 9/04 (2013.01); H02K 9/10 (2013.01); *H02K 7/1823* (2013.01)

(58) Field of Classification Search
CPC ........... H02K 9/02; H02K 9/10; H02K 9/197; H02K 7/1823; H02K 9/04
See application file for complete search history.

(56) References Cited

U.S. PATENT DOCUMENTS

| | | | | |
|---|---|---|---|---|
| 2,285,960 | A * | 6/1942 | Fechheimer | H02K 9/197 |
| | | | | 290/2 |
| 10,801,410 | B2 | 10/2020 | Roberge | |
| 11,092,031 | B2 | 8/2021 | Frank et al. | |
| 2001/0018824 | A1* | 9/2001 | Leone | F01D 25/12 |
| | | | | 60/772 |
| 2012/0306206 | A1* | 12/2012 | Agrawal | H02K 1/32 |
| | | | | 290/52 |
| 2018/0337571 | A1* | 11/2018 | Pal | H02K 9/197 |

(Continued)

FOREIGN PATENT DOCUMENTS

WO      2022117452 A1     6/2022

OTHER PUBLICATIONS

European Search Report for Application No. 24180922.7, mailed Oct. 24, 2024, 9 pages.

*Primary Examiner* — Tulsidas C Patel
*Assistant Examiner* — Robert E Mates
(74) *Attorney, Agent, or Firm* — CANTOR COLBURN LLP

(57) ABSTRACT

An electric machine includes a housing, a stator positioned in the housing and including a stator winding, and a rotor positioned in the housing configured to rotate about a machine axis and electromagnetically interactive with the stator across an air gap between the rotor and the stator. The rotor includes a rotor core, a plurality of permanent magnets located at the rotor core, and a rotor sleeve enclosing the rotor core and the plurality of permanent magnets. The stator is cooled via a flow of cooling oil, and the rotor is cooled via a flow of cooling air directed through the air gap between the rotor sleeve and the stator.

13 Claims, 4 Drawing Sheets

(56) References Cited

U.S. PATENT DOCUMENTS

| 2022/0255396 A1* | 8/2022 | Pazinski | F02K 5/00 |
| 2023/0108862 A1* | 4/2023 | Høyland | H02K 9/197 |
| | | | 310/216.113 |

* cited by examiner

HYBRID LIQUID AND AIR COOLING OF HIGH-POWER PERMANENT MAGNET MACHINE ROTOR

BACKGROUND

Exemplary embodiments pertain to the art of electric machines, and more particularly to rotor cooling of permanent magnet electric machine rotors.

High-speed and high-power permanent magnet machines utilize a rotor sleeve to, in part, retain the permanent magnets to the rotor core. In some configurations, this rotor sleeve is formed from steel. Due to high rotational speed of the machine, there is significantly high windage loss generated between rotor and stator air gap. Further, the high current due to operation of the electric machine results in losses in the rotor sleeve as well as in the permanent magnets. In the existing cooling schemes, the majority of the axial length of the rotor sleeve is not accessible to spray cooling flow from the rotor or to mist cooling flow in the air gap between the rotor and the stator. Permanent magnets are rated to a relatively lower temperature, so it is desired to have efficient cooling to maintain the permanent magnets below their rated temperature for efficient operation.

BRIEF DESCRIPTION

In one embodiment, an electric machine includes a housing, a stator positioned in the housing and including a stator winding, and a rotor positioned in the housing configured to rotate about a machine axis and electromagnetically interactive with the stator across an air gap between the rotor and the stator. The rotor includes a rotor core, a plurality of permanent magnets located at the rotor core, and a rotor sleeve enclosing the rotor core and the plurality of permanent magnets. The stator is cooled via a flow of cooling oil, and the rotor is cooled via a flow of cooling air directed through the air gap between the rotor sleeve and the stator.

Additionally or alternatively, in this or other embodiments the stator includes a stator sleeve at least partially defining the air gap. The stator sleeve and the housing define a stator chamber to contain the flow of cooling oil.

Additionally or alternatively, in this or other embodiments the flow of cooling air is directed between the stator sleeve and the rotor sleeve.

Additionally or alternatively, in this or other embodiments a cooling airflow inlet is located at a first axial end of the housing and a cooling airflow outlet is located at a second axial end of the housing.

Additionally or alternatively, in this or other embodiments the flow of cooling air is one of an ambient airflow or a bleed airflow from a power source operably connected to the electric machine.

Additionally or alternatively, in this or other embodiments the power source is an auxiliary power unit.

In another embodiment, an electric machine system includes a power source, and an electric machine operably connected to the power source to drive the electric machine. The electric machine includes a housing, a stator located in the housing and including a stator winding, and a rotor located in the housing configured to rotate about a machine central axis and electromagnetically interactive with the stator across an air gap between the rotor and the stator. The rotor includes a rotor core, a plurality of permanent magnets positioned at the rotor core, and a rotor sleeve enclosing the rotor core and the plurality of permanent magnets. The stator is cooled via a flow of cooling oil, and the rotor is cooled via a flow of cooling air directed through the air gap between the rotor sleeve and the stator.

Additionally or alternatively, in this or other embodiments the stator includes a stator sleeve at least partially defining the air gap. The stator sleeve and the housing define a stator chamber to contain the flow of cooling oil.

Additionally or alternatively, in this or other embodiments the flow of cooling air is directed between the stator sleeve and the rotor sleeve.

Additionally or alternatively, in this or other embodiments a cooling airflow inlet is located at a first axial end of the housing and a cooling airflow outlet is located at a second axial end of the housing.

Additionally or alternatively, in this or other embodiments the flow of cooling air is ambient airflow directed into the cooling airflow inlet.

Additionally or alternatively, in this or other embodiments the flow of cooling air is directed from the cooling airflow outlet to an air inlet of the auxiliary power unit.

Additionally or alternatively, in this or other embodiments the flow of cooling air is a bleed airflow from a compressor of the auxiliary power unit.

Additionally or alternatively, in this or other embodiments the auxiliary power unit includes one of a gas turbine engine or a thermal engine.

In yet another embodiment, a method of cooling an electric machine includes directing a flow of cooling oil into a stator cavity defined between a stator sleeve and a housing of the electric machine and containing one or more stator windings. The one or more stator windings are cooled via the flow of cooling oil. A flow of cooling air is directed through an air gap defined between a rotor sleeve of a rotor of the electric machine and the stator sleeve, and one or more permanent magnets of the rotor are cooled via the flow of cooling air.

Additionally or alternatively, in this or other embodiments the stator sleeve separates the flow of cooling oil from the flow of cooling air.

Additionally or alternatively, in this or other embodiments an ambient airflow is flowed into the air gap via a cooling airflow inlet as the flow of cooling air, and the flow of cooling air is flowed out of the electric machine via a cooling airflow outlet.

Additionally or alternatively, in this or other embodiments the flow of cooling air is directed from the cooling airflow outlet into an air inlet of an auxiliary power unit operably connected to the electric machine.

Additionally or alternatively, in this or other embodiments a mixture of fuel and the flow of cooling air is combusted at the auxiliary power unit, and rotation of the rotor of the electric machine is driven via the flow of combustion gases over a turbine of the auxiliary power unit.

Additionally or alternatively, in this or other embodiments a compressor bleed flow of an auxiliary power unit operably connected to the electric machine is flowed into the cooling airflow inlet at the flow of cooling air.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
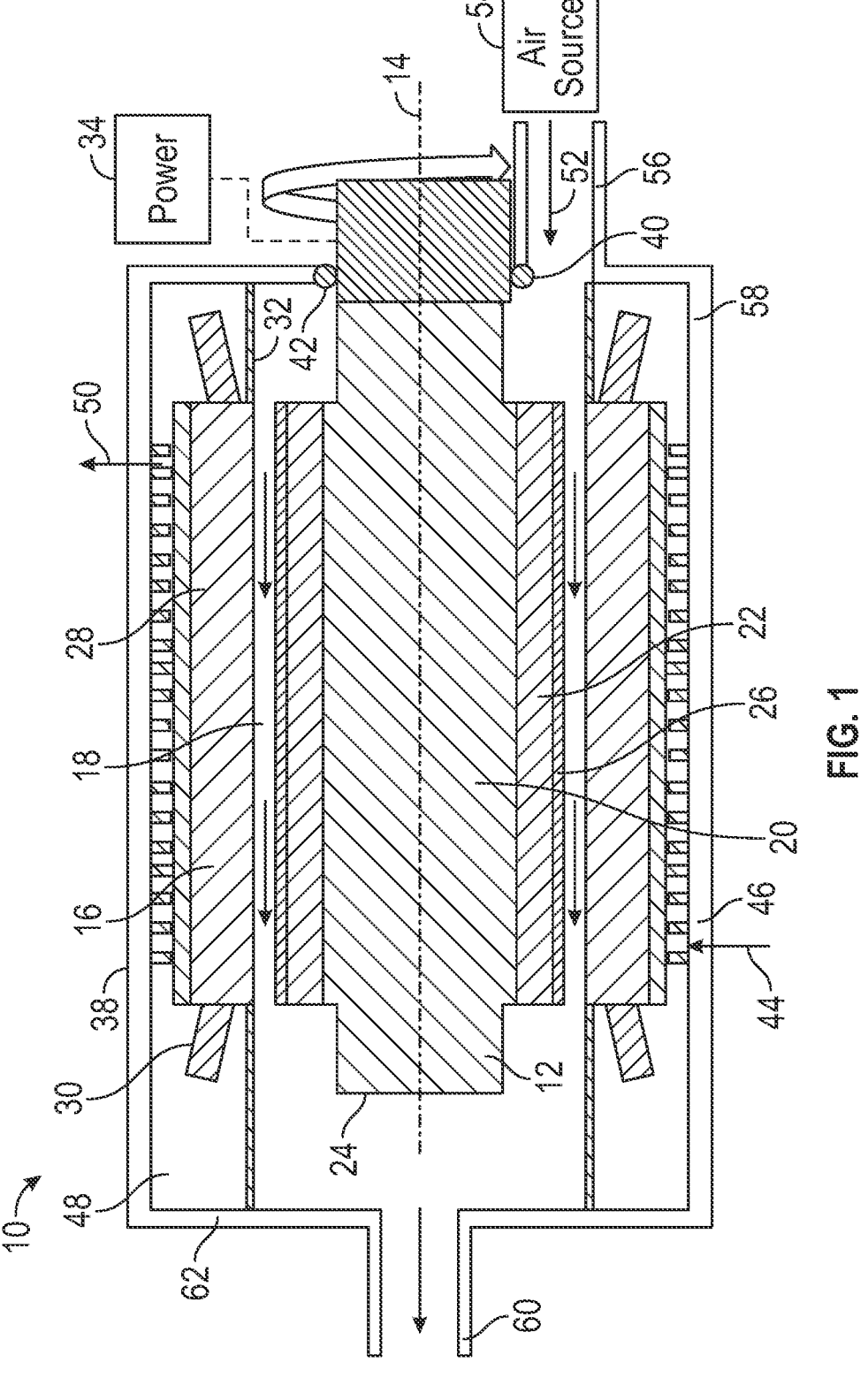
FIG. 1 is a cross-sectional view of an embodiment of an electric machine.

Illustrated in FIG. 1 is an embodiment of an electric machine 10. The electric machine 10 includes a rotor 12 which is rotatable about a machine central axis 14. The electric machine 10 further includes a stator 16 surrounding the rotor 12 and positioned radially outboard of the rotor 12. The rotor 12 and the stator 16 define an air gap 18. While in the illustrated embodiment the stator 16 is located radially outboard of the rotor 12, one skilled in the art will readily appreciate that the present disclosure may be readily applied to other machine configurations, such as configurations where the rotor 12 is located radially outboard of the stator 16.

The rotor 12 includes a rotor core 20 and a plurality of permanent magnets 22 arrayed in the rotor core 20. In some embodiments the rotor core 20 includes a substantially tubular rotor shaft 24 located at the machine central axis 14. Further, a rotor sleeve 26 is located radially outboard of the plurality of permanent magnets 22 and circumferentially surrounding the rotor core 20 to retain the plurality of permanent magnets 22 to the rotor core 20. The rotor sleeve 26 at least partially defines the air gap 18 between the rotor 12 and the stator 16. The stator 16 includes a stator core 28 with one or more stator windings 30 installed to the stator core 28. The stator 16 further includes a stator sleeve 32 to at least partially define the air gap 18 between the rotor 12 and the stator 16.

In some embodiments, as illustrated in FIG. 1, the electric machine 10 is operated as a generator in which the rotor 12 is driven about the machine central axis 14 by a power source, schematically shown at 34. Rotation of the rotor 12 relative to the stator 16 generates electromagnetic interaction between the permanent magnets 22 and the stator windings 30, resulting in electrical power being generated at the stator windings 30.

Figure 2:
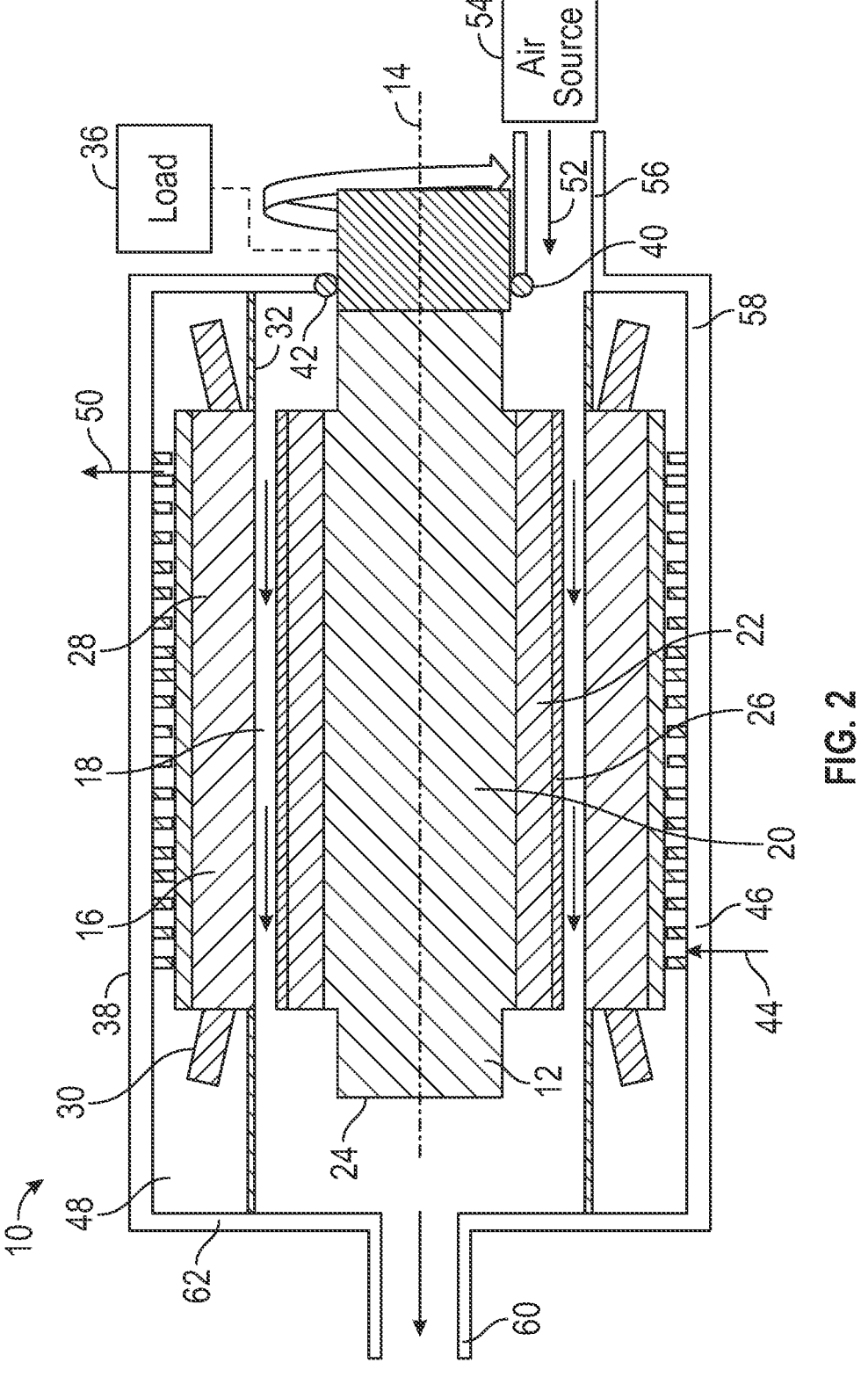
FIG. 2 is a cross-sectional view of an embodiment of an electric machine operated as a motor.

Alternatively, the electric machine 10 may be operated as a motor as illustrated in FIG. 2. In such configurations, an electrical current may be applied to the stator windings 30 which urges rotation of the rotor 12 about the machine central axis 14 due to electromagnetic interaction between the stator windings 30 and the permanent magnets 22. The rotor shaft 24 may be connected to a mechanical load 36, and provides mechanical energy thereto.

The rotor 12 and the stator 16 are at least partially contained in a machine housing 38, with the rotor shaft 24 extending through a housing opening 40 in the machine housing 38. One or more sealing elements 42 may be located between the rotor shaft 24 and the machine housing 38 to prevent leakage through the housing opening 40. The stator 16 is cooled by a flow of liquid, such as cooling oil 44 that enters the machine housing 38 at an oil inlet 46 and is circulated through a stator chamber 48 defined between the stator sleeve 32 and the machine housing 38. This stator chamber 48 contains the stator core 28 and the stator windings 30, and isolates the cooling oil 44 from the rotor 12, preventing the cooling oil 44 from reaching the components of the rotor 12. From the stator chamber 48, the cooling oil 44 exits at an oil outlet 50.

The rotor 12 is cooled by a flow of cooling air 52 directed from an ambient air source 54 and through the air gap 18 between the rotor 12 and the stator 16. The flow of cooling air 52 enters the machine housing 38 via a cooling air inlet 56 located at, for example, a first housing end 58, and the flow of cooling air 52 exits the machine housing 38 after passing through the air gap 18 at a cooling air outlet 60 located at, for example, a second housing end 62 opposite the first housing end 58. The stator sleeve 32 and the rotor sleeve 26 protect the stator 16 and the rotor 12 from ambient dust and moisture that may be incidentally introduced into the machine housing 38 with the flow of cooling air 52. While one cooling air inlet 56 and one cooling air outlet 60 are illustrated, one skilled in the art will readily appreciate that in some embodiments multiple cooling air inlets 56 and multiple cooling air outlets 60 may be utilized, such as cooling air inlets 56 and/or cooling air outlets 60 circumferentially arranged and spaced apart around the machine housing 38.

Figure 3:
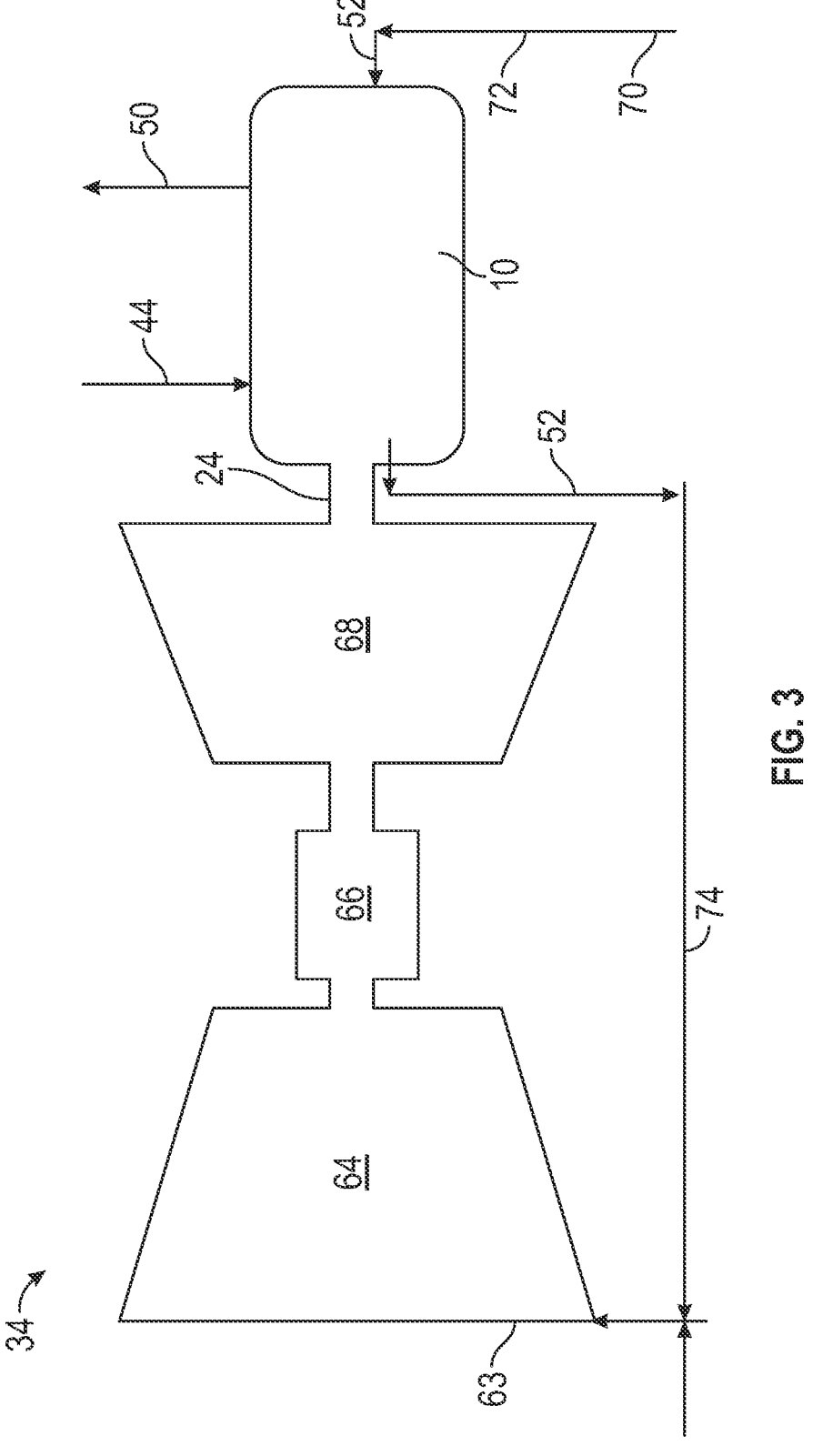
FIG. 3 is a schematic illustration of an embodiment of an electric machine and auxiliary power unit (APU) arrangement.
Figure 4:
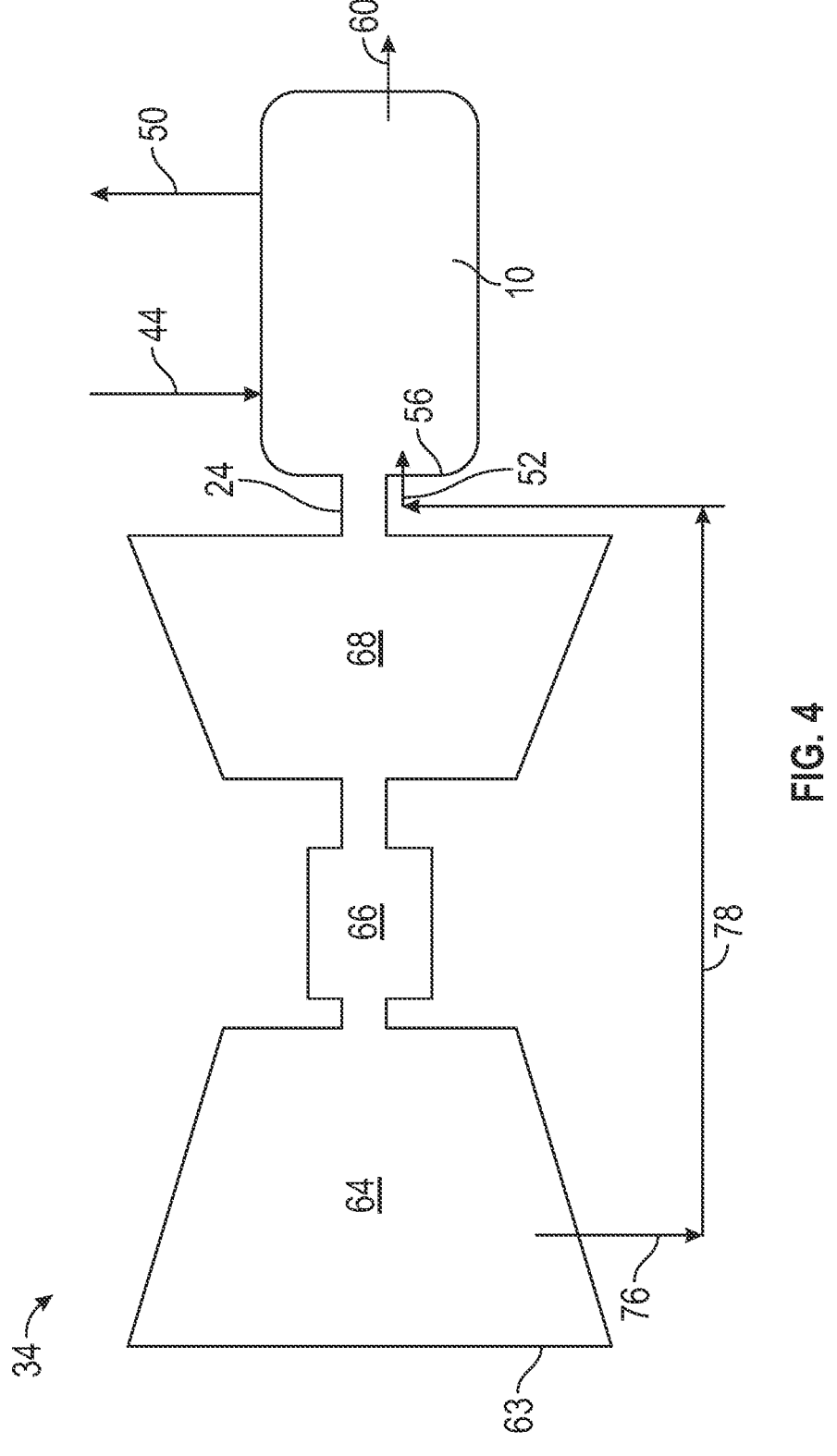
FIG. 4 is a schematic illustration of another embodiment of an electric machine and APU arrangement.

Referring now to FIGS. 3 and 4, with continuing reference to FIG. 1, in some embodiments the power source 34 which drives the electric machine 10 when operated as a generator is an auxiliary power unit (APU) 34 that may include, for example, a gas turbine or a thermal engine. In some embodiments, the APU 34 includes an APU inlet 63 through which inlet airflow is directed to a compressor section 64. The compressed airflow is mixed with fuel and combusted at a combustion chamber 66, and the flow of combustion products drive a turbine section 68. The turbine section 68 is connected to the rotor shaft 24 such that rotation of the turbine section 68 drives rotation of the rotor shaft 24 and thus the rotor 12.

Referring to FIG. 3, the flow of cooling air 52 is an ambient airflow that flows through an ambient air inlet 70 and is directed toward the cooling air inlet 56 along a cooling inlet pathway 72. After passing through the air gap 18 and out of the cooling air outlet 60, the flow of cooling air 52 is directed to the APU inlet 63 via an APU inlet pathway 74, so that the flow of cooling air 52 flows from ambient, through the electric machine 10, then is introduced to the APU 34 at the APU inlet 63.

In another embodiment, illustrated in FIG. 4, the flow of cooling air 52 is compressor bleed flow directed from a compressor bleed outlet 76 of the APU 34 and along an APU bleed pathway 78 to the cooling air inlet 56. After passing through the air gap 18, the flow of cooling air 52 is directed out of the cooling air outlet 60.

Use of the hybrid cooling arrangements disclosed herein, where the stator 16 is cooled via a flow of oil and the rotor 12 is cooled via a flow of cooling air 52 directed through the air gap 18 results in a dry rotor cavity so that air bearings or magnetic bearings may be used to support the rotor 12. The cooling arrangement exhibits very low windage losses at very high rotor speeds, such as those greater than 50,000 RPM. The effective cooling of both the rotor 12 and the stator 16 improves performance of the rotor 12 and the electric machine 10. This improves the power to weight ratio of the electric machine 10 when compared to other cooling schemes and improves reliability of the electric machine due to the reduced operating temperatures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric machine, comprising:
a housing:
    a stator disposed in the housing and including a stator winding; and
    a rotor disposed in the housing configured to rotate about a machine central axis and electromagnetically interact with the stator across an air gap between the rotor and the stator, the rotor including:
        a rotor core;
        a plurality of permanent magnets disposed at the rotor core;
        a rotor sleeve enclosing the rotor core and the plurality of permanent magnets;
        wherein the stator is configured to be cooled via a flow of cooling oil; and
        wherein the rotor is configured to be cooled via a flow of cooling air directed through the air gap between the rotor sleeve and the stator;
        further comprising a cooling airflow inlet at a first axial end of the housing and a cooling airflow outlet at a second axial end of the housing to direct the flow of cooling air through the air gap;
        wherein the flow of cooling air is ambient airflow directed into the cooling airflow inlet; and
        wherein the flow of cooling air is directed from the cooling airflow outlet to an air inlet of an auxiliary power unit operably connected to the electric machine to power the electric machine.

2. The electric machine of claim 1, wherein the stator includes a stator sleeve, such that the air gap is at least partially defined between the stator sleeve and the rotor sleeve, the stator sleeve and the housing defining a stator chamber to contain the flow of cooling oil.

3. The electric machine of claim 2, wherein the stator sleeve and the rotor sleeve are configured such the flow of cooling air is directed therebetween.

4. The electric machine of claim 1, wherein the flow of cooling air is one of an ambient airflow or a bleed airflow from the auxiliary power unit.

5. An electric machine system, comprising:
an auxiliary power unit; and
an electric machine operably connected to the auxiliary power unit to drive the electric machine, the electric machine including:
    a housing:
        a stator disposed in the housing and including a stator winding; and
        a rotor disposed in the housing configured to rotate about a machine central axis and electromagnetically interact with the stator across an air gap between the rotor and the stator, the rotor including:
            a rotor core;
            a plurality of permanent magnets disposed at the rotor core;
            a rotor sleeve enclosing the rotor core and the plurality of permanent magnets;
            wherein the stator is configured to be cooled via a flow of cooling oil; and
            wherein the rotor is configured to be cooled via a flow of cooling air directed through the air gap between the rotor sleeve and the stator;
            further comprising a cooling airflow inlet at a first axial end of the housing and a cooling airflow outlet at a second axial end of the housing to direct the flow of cooling air through the air gap;
            wherein the flow of cooling air is ambient airflow directed into the cooling airflow inlet; and
            wherein the flow of cooling air is directed from the cooling airflow outlet to an air inlet of the auxiliary power unit.

6. The electric machine system of claim 5, wherein the stator includes a stator sleeve, such that the air gap is at least partially defined between the stator sleeve and the rotor sleeve, the stator sleeve and the housing defining a stator chamber to contain the flow of cooling oil.

7. The electric machine system of claim 6, wherein the stator sleeve and the rotor sleeve are configured to direct the flow of cooling air therebetween.

8. The electric machine system of claim 5 wherein the flow of cooling air is a bleed airflow from a compressor of the auxiliary power unit.

9. The electric machine system of claim 5, wherein the auxiliary power unit includes one of a gas turbine engine or a thermal engine.

10. A method of cooling an electric machine, comprising:
directing a flow of cooling oil into a stator cavity defined between a stator sleeve and a housing of the electric machine and containing one or more stator windings;
cooling the one or more stator windings via the flow of cooling oil;
directing a flow of cooling air through an air gap defined between a rotor sleeve of a rotor of the electric machine and the stator sleeve;
cooling one or more permanent magnets of the rotor via the flow of cooling air;
flowing an ambient airflow into the air gap via a cooling airflow inlet as the flow of cooling air;
flowing the flow of cooling air out of the electric machine via a cooling airflow outlet; and
directing the flow of cooling air from the cooling airflow outlet into an air inlet of an auxiliary power unit operably connected to the electric machine.

11. The method of claim 10, wherein the stator sleeve separates the flow of cooling oil from the flow of cooling air.

12. The method of claim 10, further comprising:

combusting a mixture of fuel and the flow of cooling air at the auxiliary power unit; and driving rotation of the rotor of the electric machine via a flow of combustion gases over a turbine of the auxiliary power unit.

13. The method of claim 10, further comprising flowing a compressor bleed flow of the auxiliary power unit into the cooling airflow inlet as the flow of cooling air.

* * * * *